Nov. 15, 1927.  1,649,002
F. SWICKARD
CUTTING APPARATUS
Filed March 31, 1926   2 Sheets-Sheet 1
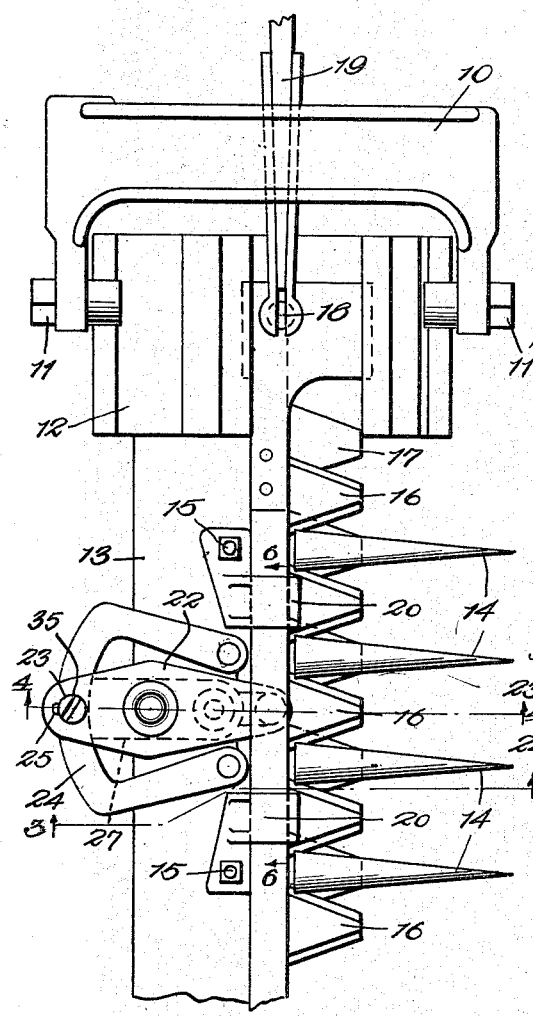
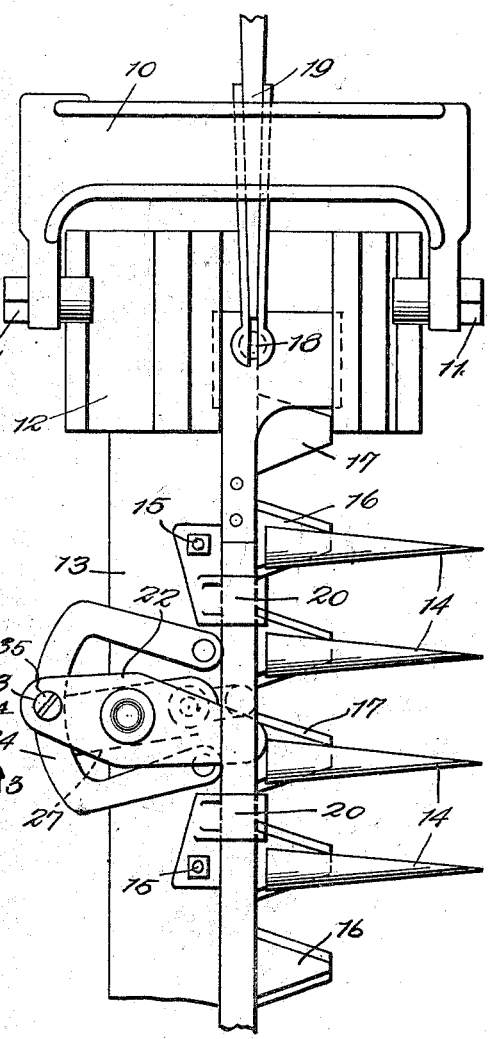
Inventor
*Frank Swickard.*
By *Walter W Burns*
Attorney Nov. 15, 1927. 1,649,002

F. SWICKARD

CUTTING APPARATUS

Filed March 31, 1926  2 Sheets-Sheet 2

Inventor
Frank Swickard
By Walter W Burns
Attorney

Patented Nov. 15, 1927.

1,649,002

UNITED STATES PATENT OFFICE.

FRANK SWICKARD, OF CLARINDA, IOWA, ASSIGNOR TO TITANIC DOUBLE CUTTER TRUST, OF CLARINDA, IOWA, A TRUST OF IOWA.

CUTTING APPARATUS.

Application filed March 31, 1926. Serial No. 98,737.

This invention relates to mowing machine cutting mechanism and particularly to that type of mowing machine cutting mechanism wherein are provided two reciprocating cutting sickles.

In the usual type of two-sickle reciprocating cutting mechanism, a special type of driving mechanism has to be provided to drive the particular kind of a cutting apparatus. This special construction of a driving device makes it difficult and usually impossible to use the double or two-sickle apparatus on a machine built for a single cutter mechanism. Further, while the advantages of the double cutter per se have been recognized, a great many of the structures heretofore have been made with either heavy or duplicate driving mechanisms which mechanisms, by their disadvantages due to increase in weight and friction, more than offset the advantages brought about by the use of the two-sickle cutting apparatus.

The primary object of my invention is the provision of an improved two-sickle cutting apparatus for mowing machines.

Another object of my invention is the provision of an improved two-sickle reciprocating cutting apparatus which will be operable by a single drive means and applicable to a single sickle mowing machine to convert the same to a double sickle mowing machine.

Another object of my invention is the provision of a two-sickle reciprocating cutting apparatus which may be applied to the ordinary single cutter machine without changing the inner or outer shoes of the sickle bar.

Another and further object of my invention is the provision of an improved two-sickle cutting mechanism wherein one of the sickles is driven from the other sickle by an improved driving mechanism which may be attached at practically any place throughout the length of the sickle length.

Another and still further object of my invention is the provision of an improved two-sickle cutting mechanism having a drive connection between the two sickles, the upper sickle being connected thereto on the top and the lower sickle being connected thereto on the bottom.

Another and still further object of my invention is the provision of an operating mechanism for a two-sickle cutting apparatus which mechanism has its operating parts located at the rear of the sickle blades.

Another and still further object of my invention is the provision of an improved two-sickle cutting apparatus for mowing machines and the like wherein two coacting levers connected to the sickles cause opposite reciprocation of the sickles.

Another and still further object of my invention is the provision of an improved two-sickle cutting apparatus for mowing machines and the like wherein two coacting levers have their fulcrums on opposite sides of the connection between the levers.

Another and still further object of my invention is the provision of a two-sickle cutting apparatus for mowing machines and the like wherein the parts are so constructed as to prevent side draft.

Other and further objects will be apparent to those skilled in the art from a reading of the complete specification and claims.

Referring to the drawing wherein I have illustrated a preferred embodiment.

Fig. 1 is a plan view of a portion of a cutting mechanism as applied to a mowing machine and embodying my invention.

Fig. 2 is a view similar to Fig. 1 but showing the parts in different positions.

Similar reference characters refer to the same or similar parts throughout the several views of the drawing.

Figure 3:
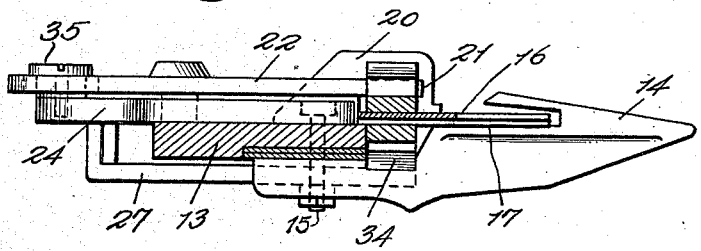
Fig. 3 is a cross section on the line 3—3 of Fig. 1.
Figure 4:
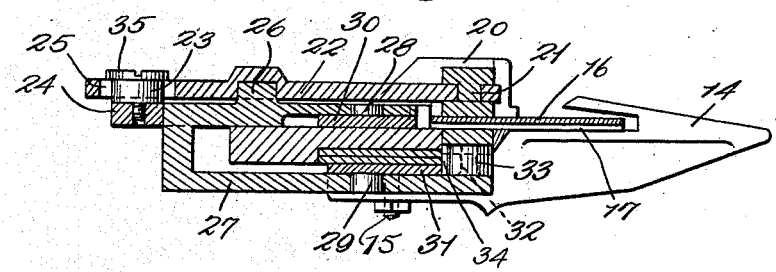
Fig. 4 is a cross section on the line 4—4 of Fig. 1.
Figure 5:
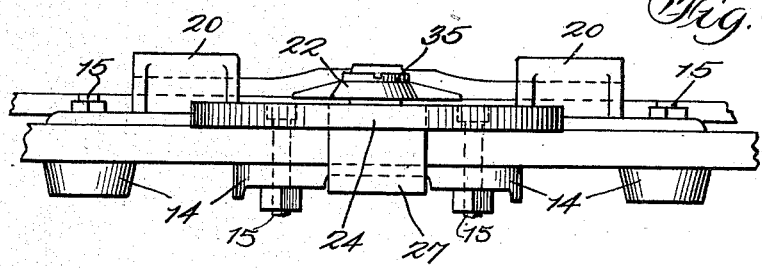
Fig. 5 is a fragmental rear view of the sickle operating mechanism when in place.
Figure 6:
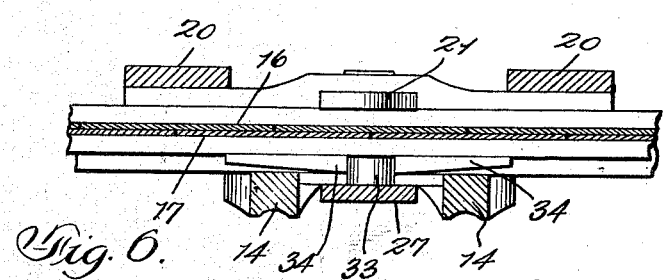
Fig. 6 is a fragmental view taken on the line 6—6 of Fig. 1.

In the drawing 10, designates the yoke of a mowing machine to which is pivotally connected at 11, 11 the inner shoe 12 of the cutting apparatus. Secured to the inner shoe 12 is the sickle bar 13. The guard fingers 14 are secured to the sickle bar 13 by bolts 15 in the usual manner.

The cutting mechanism comprises two complementary superimposed sickles, the upper one being designated 16 and the lower one being designated 17. Each sickle comprises a strap to which are attached a series of blades which are beveled to provide cutting edges. The sickle construction per se, as illustrated, is old and well known and need not further be described.

The rear portion of the sickle blades 17 rest upon the top of the sickle bar 13. The guard fingers 14 are of the usual construction having a recess adjacent the forward edge of the sickle bar, to receive the strap of the lower sickle 17. The upper sickle is superimposed upon the lower sickle, its strap being above its blades.

The upper sickle 16 is provided with a ball 18 to which is connected the socketed pitman 19 which is connected to the driving gearing to operate the cutting apparatus from the ground wheels or other power supply means.

At intervals to sufficiently hold the upper sickle 16 in its superimposed relation to the lower sickle 17, are guides 20 which are suitably bolted to the sickle bar and while they serve to hold the upper sickle 16 in place, they do not interfere with the free reciprocation of the same.

In the form of my invention herein illustrated, I have shown my improved connections between the upper and lower sickles as being located at a particular place on the sickle bar. It is to be understood that the structure to be now described may be placed anywhere throughout the length of the sickle bar where attachment may be made between the usual outer shoe (not shown) and the inner shoe 12.

The connections for driving the lower sickle 17 from the upper sickle 16, comprises a pair of coacting levers having a connection whereby when the front end of one lever moves in one direction, the front end of the other lever travels in the opposite direction thus giving the lower sickle a reciprocating motion, with, but in directions opposite to, the upper sickle 16 as the latter is driven by the pitman 19.

Connected to the upper sickle 16 is a pivot pin 21 to which is pivotally connected one end of a lever 22. The rear end of this lever has a slot which is in registry with a pin 23, which latter forms a fulcrum for the lever to slide on. This pin 23 is mounted on a suitable yoke frame 24 which is secured in place by the bolts 15 which also hold in place the guard fingers 14 already described. A slot 25 is provided in the lever 22 for the reason that the pin 21, upon which the lever 22 is pivoted, travels in a straight line. The lever 22 is connected at a point intermediate its ends to a pivot 26 which forms a part of a yoke lever 27 having a fulcrum pivot 28 above the sickle bar and another fulcrum pivot 29 therebelow. The pivot 28, in the embodiment herein shown, is made as an integral part of a web portion 30 which is in turn an integral part of the yoke 24. The pivot 29, in the embodiment herein shown, is made integral with a web portion 31 which is integral with the two adjacent guard fingers 14. The pivots 28 and 29 are coaxial.

The forward end of the yoke lever 27 is provided with a bearing 32 upon which is mounted a bearing ring 33. The function of the bearing ring 33 is to press against the lugs or abutments 34 which are attached to the underside of the sickle 17 and present flat surfaces a distance apart equal to the diameter of the bearing ring 33.

During the operation, the pivots 28, 29 and 23 maintain their respective positions, the pivots 21 and 32 always travel in opposite directions, the pivot 32 actually travelling in an arc about the axes of 28, 29 but causing the lower sickle 17 to travel in a straight line. The pivot 26 travels in a circular path about the axes 28, 29 and causes the yoke lever 27 to move.

Since the axes of the pivot 21 and the pivot 26 are fixed relative to the lever 22 and since the movement of the pivot 21 is confined to a straight line which is described by the movement of the sickle, the distance between the axes of the pivots 26 and 21 remain the same while the distance between the axis of the pivot 21 and the point of contact between the slot 25 and the roller 23 increases in each direction as the pivot 21 passes a line drawn through the axis of the roller 23 and 90° to the line of travel of the cutter. The slot 25 is provided for the reason that the axis of the roller 23 is fixed in the yoke 24.

If my invention is to be applied to a cutting apparatus of a mowing machine wherein a single cutter has been used, the sickle bar is removed from the inner shoe 12 and several of the guard fingers are removed. To a sickle which is to be the upper sickle in the new construction, is attached the pivot member 21, together with the lever 22, the latter being secured in place on the pivot member and adjacent the upper surface of the upper sickle 16. The lugs or abutments 34 are attached at the proper place on the lower sickle.

The ball and socket connection and rod 18, 19 are connected to the upper sickle 16 as shown in Fig. 1 but the parts are not yet assembled.

The yoke member 24 is slipped with its web member 30 within the yoke lever 27 and the pivot 28 is put in its place. The two guard fingers are placed between the two parts of the yoke lever 27 so that the pivot 29 takes its place. With the yoke 24, the two guard fingers 14 with the web 31 and the yoke member 24 in their relative positions as just described, the sickle bar is slipped in between the two web portions 30 and 31 until the parts are in their proper places. The bolts 15 are now placed in the openings in the guard fingers, through the sickle bar and the openings in the yoke 24. These bolts are now secured with their respective nuts.

The lower sickle 17 is now inserted in place so that the lugs 34 will engage on opposite sides of the bearing ring 33. The upper sickle bar is now put in place and the lever 22 so placed that its bearings will engage the pivot 26 and the slot 25 will engage the pivot 23. The cap screw 35 having a threaded shank is now applied, the shank portion registering with a correspondingly threaded opening in the pivot 23. The guides 20 are now secured in place. The parts are now ready for operation.

I will now describe the operation of my invention:—

As the pitman 19 forces the upper sickle 16 outwardly—downwardly in Fig. 1,—the lever 22 will be swung accordingly about the sliding fulcrum 23. This causes, by reason of the pivot 26, the movement of the yoke lever 27 in a counter clockwise direction as viewed from above (as in Fig. 1 and Fig. 2). This movement of the yoke lever 27 causes the forward bearing ring 33 to move in an opposite direction from that of the pivot 21. A reversal of the movement of the upper cutter causes a consequent reversal of movement of the lower sickle so that whenever sickles move, they move in opposite directions. As already pointed out, the axis of 28, 29 is fixed and consequently the pivot 26 moves circumferentially about the same. The proportions of the distances between pivots of the levers 22 and 27 are such that the pivot connection to the upper sickle 16 will move in a straight line. In the embodiment illustrated the movement of the upper sickle is sufficient to move each blade a sufficient distance to go from substantially the center of one guard finger to substantially the center of the next guard finger. The distances between pivots are so related that the movement of the lower sickle will be substantially equal to the width of a guard finger. With this arrangement, two cutting lines more nearly on the line of travel are produced than is possible with a single movable sickle. This movable action of the cutters also keeps the guard fingers clear of dirt and small pieces of straw.

This method of clean cutting independently of the guard fingers prevents side draft so often present in the cutting mechanisms now in use.

While I have illustrated and described in detail an embodiment of my invention, I desire to have it understood that I do not limit myself to the exact showing and that modifications and changes may be made without departing from the spirit of my invention and within the scope of the appended claims.

Having described my invention, what I claim is:—

1. A cutting mechanism for mowers and the like, comprising a sickle bar, two superimposed sickles, connections between the sickles and mounted on the sickle bar for causing the sickles to operate in opposite directions, the connections comprising two cooperating levers.

2. A cutting mechanism for mowers and the like, comprising two superimposed sickles, connections between the sickles for causing them to operate in opposite directions, said connections comprising two connected levers, the point of connection between the levers being located between their fulcrums.

3. A cutting mechanism for mowers and the like, comprising a sickle bar, two superimposed sickles, connections between the sickles for causing them to operate in opposite directions, the connections comprising two cooperating levers, the levers being located substantially wholly to the rear of the cutting edges of the sickle and supported upon the sickle bar.

4. A cutting mechanism for mowers and the like, comprising a sickle bar, two superimposed sickles, connections between the sickles for causing them to operate in opposite directions, the connections comprising two cooperating levers, separate fulcrums for the levers, the forward ends of the levers being connected to the respective sickles.

5. A cutting mechanism for mowers and the like, comprising a sickle bar, movable members including two superimposed sickles and connections between the sickles, said connections causing the sickles to operate in opposite directions, the connections comprising two cooperating levers extending rearwardly of the sickles, the forward ends of the levers being directly connected to the respective sickles and a power element connected to one of the movable members at a point forward of the rear end of the levers.

6. A cutting mechanism for mowers and the like, comprising a sickle bar, two superimposed sickles, connections between the sickles for causing them to operate in opposite directions, the connections comprising two cooperating levers, one of the levers being pivotally connected to a sickle, the other lever having a double abutment connection to the other sickle.

7. A cutting mechanism for mowers and the like, comprising a sickle bar, two superimposed sickles, connections between the sickles for causing them to operate in opposite directions, the connections comprising two cooperating levers each having a fulcrum, the two levers having a superimposed relation and a pivotal connection therebetween, the pivotal connection having its axis parallel to the axis of one of the fulcrums and lying between the two fulcrums.

8. A cutting mechanism for mowers and the like, comprising a sickle bar, two superimposed sickles, connections between the sickles for causing them to operate in opposite directions, the connections comprising two cooperating levers each having a fulcrum, one of the levers being pivoted to the upper sickle at its forward end and having a sliding engagement with its fulcrum at its rearward end and a pivotal connection with the other lever at an intermediate point, the other lever being of a yoke shape and having its forward end connected to the lower sickle.

9. A cutting mechanism for mowers and the like, comprising a sickle bar, two superimposed sickles, connections between the sickles for causing them to operate in opposite directions, the connections comprising two cooperating levers, one of the levers being connected at its forward end to one of the sickles, the other lever being of a yoke shape having one portion on one side of the sickle bar and in engagement with its sickle and the other portion on the opposite side in engagement with the other lever.

10. A cutting mechanism for mowers and the like, comprising a sickle bar, two superimposed sickles, connections between the sickles for causing them to operate in opposite directions, the connections comprising two cooperating levers, one of the levers being connected at its forward end to the upper sickle, the other lever being of a yoke shape and having one part of the yoke pivoted above the sickle bar and the other part pivoted below the sickle bar, the portion pivoted below the sickle bar being operatively connected to the lower sickle, the upper part of the yoke having a pivotal connection with the other lever.

11. A cutting mechanism for mowers and the like, comprising guard fingers, a sickle bar, two superimposed sickles, a driving means directly connected to one sickle, connections between the sickles for causing them to operate in opposite directions, the connections comprising two cooperating levers each having a fulcrum, the levers having their forward ends connected to the respective sickles, the arms and fulcrums of the levers being so relatively placed as to cause the relative movement of one sickle to be much less than that of the other sickle.

12. A cutting mechanism for mowers and the like, comprising guard fingers, a sickle bar, two superimposed sickles, a driving means connected to one sickle, connections between the sickles for causing them to operate in opposite directions, the connections comprising two cooperating levers having their forward ends connected to the respective sickles, one of the levers being connected to the under sickle between two of the guard fingers.

13. A cutting mechanism for mowers and the like, comprising a sickle bar, guard fingers, means for securing the guard fingers to the sickle bar, two superimposed sickles, a driving means directly connected to one sickle, a yoke having its ends held in place on the sickle bar by the means for securing two guard fingers to the sickle bar, a lever having a fulcrum on the yoke and being pivotally connected to one sickle, a second lever of U-shape having a direct connection with the first named lever and a driving connection with the other sickle, the U-portion of the second lever receiving the sickle bar.

14. A driving connection for double cutter mechanisms comprising a yoke member having means for securement to the sickle bar of a mowing machine, a lever having its fulcrum on the yoke, and its forward end provided with means for operative connection to a sickle, a second lever having a pivotal connection with the first lever and a fulcrum forward of the pivotal connection, and having a forward end provided with means to make a driving connection with the other sickle, the pivotal connection of the first lever being between its fulcrum and the connection for the first sickle.

In testimony whereof I hereunto affix my signature.

FRANK SWICKARD.